United States Patent
Hu et al.

(10) Patent No.: US 10,911,111 B2
(45) Date of Patent: Feb. 2, 2021

(54) RANK-2 CSI CONSTRUCTION WITH 1-LAYER SRS

(71) Applicant: Samsung Electronics Co., Ltd., Suwon-si (KR)

(72) Inventors: Yeqing Hu, Garland, TX (US); Ahmed Ibrahim, Plano, TX (US); Young-Han Nam, Plano, TX (US); Jianzhong Zhang, Plano, TX (US); Eun Yong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/594,918

(22) Filed: Oct. 7, 2019

(65) Prior Publication Data
US 2020/0112352 A1 Apr. 9, 2020

Related U.S. Application Data

(60) Provisional application No. 62/742,660, filed on Oct. 8, 2018, provisional application No. 62/820,460, filed on Mar. 19, 2019.

(51) Int. Cl.
*H04L 1/02* (2006.01)
*H04B 7/0456* (2017.01)
(Continued)

(52) U.S. Cl.
CPC ......... *H04B 7/0469* (2013.01); *H04B 7/0417* (2013.01); *H04B 7/0452* (2013.01)

(58) Field of Classification Search
CPC .... H04L 1/0618; H04L 1/06; H04W 72/0413; H04W 72/04; H04B 7/0486; H04B 7/0408
(Continued)

(56) References Cited

U.S. PATENT DOCUMENTS 8,989,295 B2    3/2015 Shov et al.
2013/0243110 A1*    9/2013 Skov ............ H04B 7/0408
                                                                375/267

(Continued)

OTHER PUBLICATIONS

International Search Report and Written Opinion of the International Searching Authority in connection with International Application No. PCT/KR2019/013205 dated Jan. 21, 2020, 7 pages.

(Continued)

*Primary Examiner* — Khai Tran

(57) ABSTRACT

A method of a base station (BS) in a wireless communication system is provided, The method comprises: receiving, from a user equipment (UE), a $1^{st}$ layer sounding reference signal (SRS); arranging the $1^{st}$ layer SRS based on two antenna polarizations of an antenna system of the BS; identifying a dominant direction of a channel based on the $1^{st}$ layer SRS; identifying a coefficient between two antenna polarizations based on the $1^{st}$ layer SRS; constructing a 2-layer channel matrix based on the identified dominant direction and the identified coefficient; and transmitting, to the UE, a downlink signal via the antenna system based on the constructed 2-layer channel matrix.

20 Claims, 15 Drawing Sheets

(51) Int. Cl.
*H04B 7/0417* (2017.01)
*H04B 7/0452* (2017.01)

(58) Field of Classification Search
USPC .......................... 375/267, 260; 370/252, 329
See application file for complete search history.

(56) References Cited

U.S. PATENT DOCUMENTS

| | | | |
|---|---|---|---|
| 2014/0341119 A1* | 11/2014 | Wang .................... | H04B 7/063 370/329 |
| 2016/0135180 A1 | 5/2016 | Yuan et al. | |
| 2016/0157218 A1 | 6/2016 | Nam et al. | |
| 2017/0019161 A1 | 1/2017 | Wang et al. | |

OTHER PUBLICATIONS

ZTE, "Enhancements on Type II CSI feedback for MU-MIMO," R1-1808201, 3GPP TSG RAN WG1 Meeting #94, Aug. 20-24, 2018, 5 pages.
Qualcomm Incorporated, "CSI Enhancement for MU-MIMO Support," R1-1811276, 3GPP TSG RAN WG1 Meeting #94bis, Oct. 8-12, 2018, 6 pages.

* cited by examiner

RANK-2 CSI CONSTRUCTION WITH 1-LAYER SRS

CROSS-REFERENCE TO RELATED APPLICATION(S) AND CLAIM OF PRIORITY

The present application claims priority to U.S. Provisional Patent Application Ser. No. 62/742,660 filed on Oct. 8, 2018 and U.S. Provisional Patent Application Ser. No. 62/820,460, filed on Mar. 19, 2019. The content of the above-identified patent documents is incorporated herein by reference.

TECHNICAL FIELD

The present disclosure relates generally to MIMO transmission and reception in wireless communication systems. Specifically, the present disclosure relates to rank-2 CSI construction and rank adaptation with 1-layer SRS in an advanced wireless communication system.

BACKGROUND

LTE system supports transmitting 2 layers per UE. To design beamforming in MU-MIMO scenario, knowing the dual-layer channel state information (CSI) per UE is critical. However, current commercial UEs do not support transmitting SRS from 2 antennas nor transmitting antenna switching (TAS), though the UEs can receive using 2 antennas. As a result, only 1-layer CSI is available on the BS side. In order to achieve higher system throughput, CSI may be provided for the $2^{nd}$ layer. On another front, UEs report rank preference to BS side, i.e., either operating as rank-1 UE or rank-2 UE. However, a UE reporting is not always the best way to follow when transmitting data from BS side to the UE side. In the present disclosure, a new rank adaptation scheme is provided that a BS can use to update the rank information reported by UEs.

SUMMARY

Embodiments of the present disclosure provide methods and apparatuses for rank-2 CSI construction and rank adaptation with 1-layer SRS in an advanced wireless communication system.

In one embodiment, a base station (BS) in a wireless communication system is provided. The BS comprises a transceiver configured to receive, from a user equipment (UE), a $1^{st}$ layer sounding reference signal (SRS). The BS station further comprises a processor operably connected to the transceiver, the processor configured to: arrange the $1^{st}$ layer SRS based on two antenna polarizations of an antenna system of the BS; identify a dominant direction of a channel based on the $1^{st}$ layer SRS; identify a coefficient between two antenna polarizations based on the $1^{st}$ layer SRS; and construct a 2-layer channel matrix based on the identified dominant direction and the identified coefficient. The transceiver is further configured to transmit, to the UE, a downlink signal via the antenna system based on the constructed 2-layer channel matrix.

In another embodiment, a method of a BS in a wireless communication system is provided. The method comprises: receiving, from a UE, a $1^{st}$ layer SRS; arranging the $1^{st}$ layer SRS based on two antenna polarizations of an antenna system of the BS; identifying a dominant direction of a channel based on the $1^{st}$ layer SRS; identifying a coefficient between two antenna polarizations based on the $1^{st}$ layer SRS; constructing a 2-layer channel matrix based on the identified dominant direction and the identified coefficient; and transmitting, to the UE, a downlink signal via the antenna system based on the constructed 2-layer channel matrix.

In yet another embodiment, a non-transitory computer-readable medium is provided. The non-transitory computer-readable medium comprising program code, that when executed by at least one processor, causes a BS in a wireless communication system to: receive, from a UE, a $1^{st}$ layer SRS; arrange the $1^{st}$ layer SRS based on two antenna polarizations of an antenna system of the BS; identify a dominant direction of a channel based on the $1^{st}$ layer SRS; identify a coefficient between two antenna polarizations based on the $1^{st}$ layer SRS; construct a 2-layer channel matrix based on the identified dominant direction and the identified coefficient; and transmit, to the UE, a downlink signal via the antenna system based on the constructed 2-layer channel matrix.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
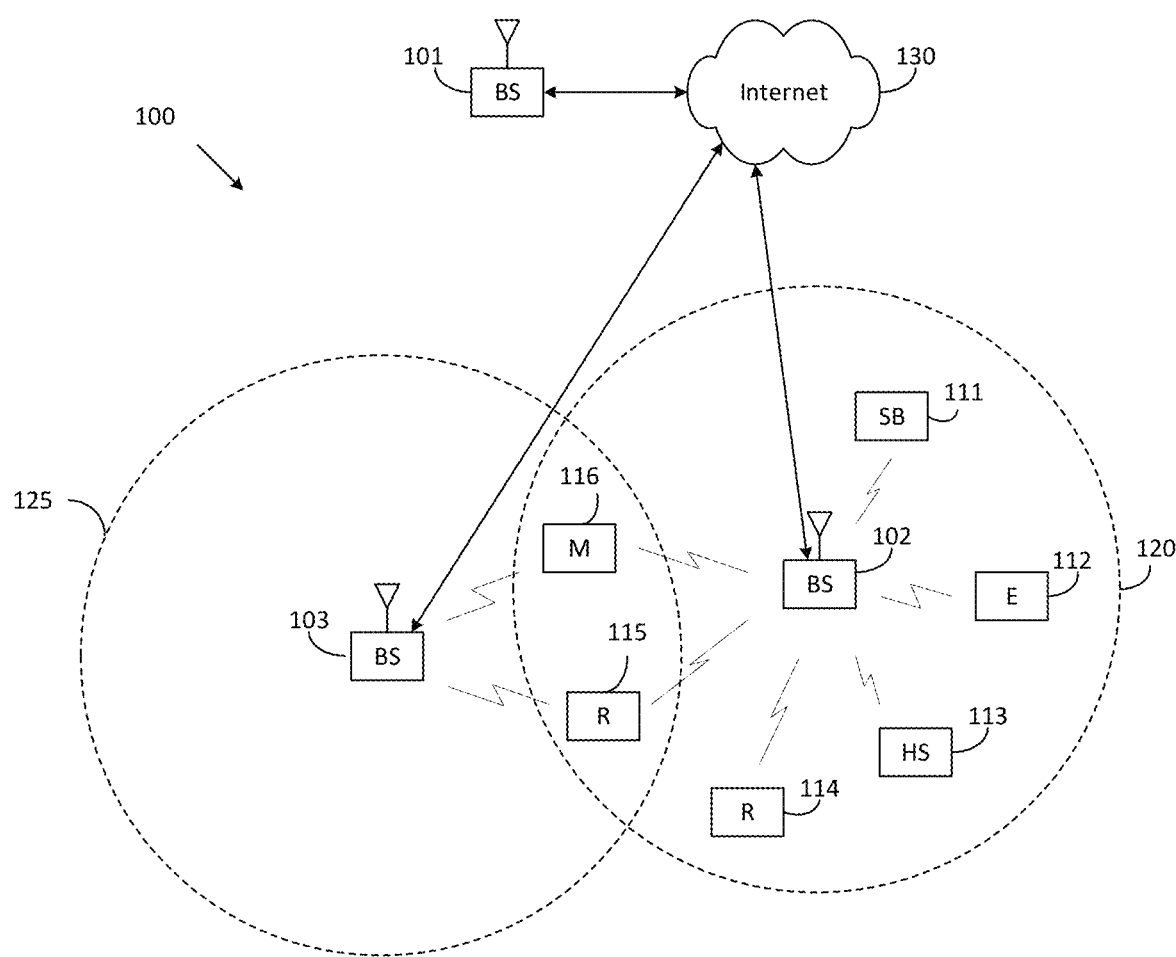
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
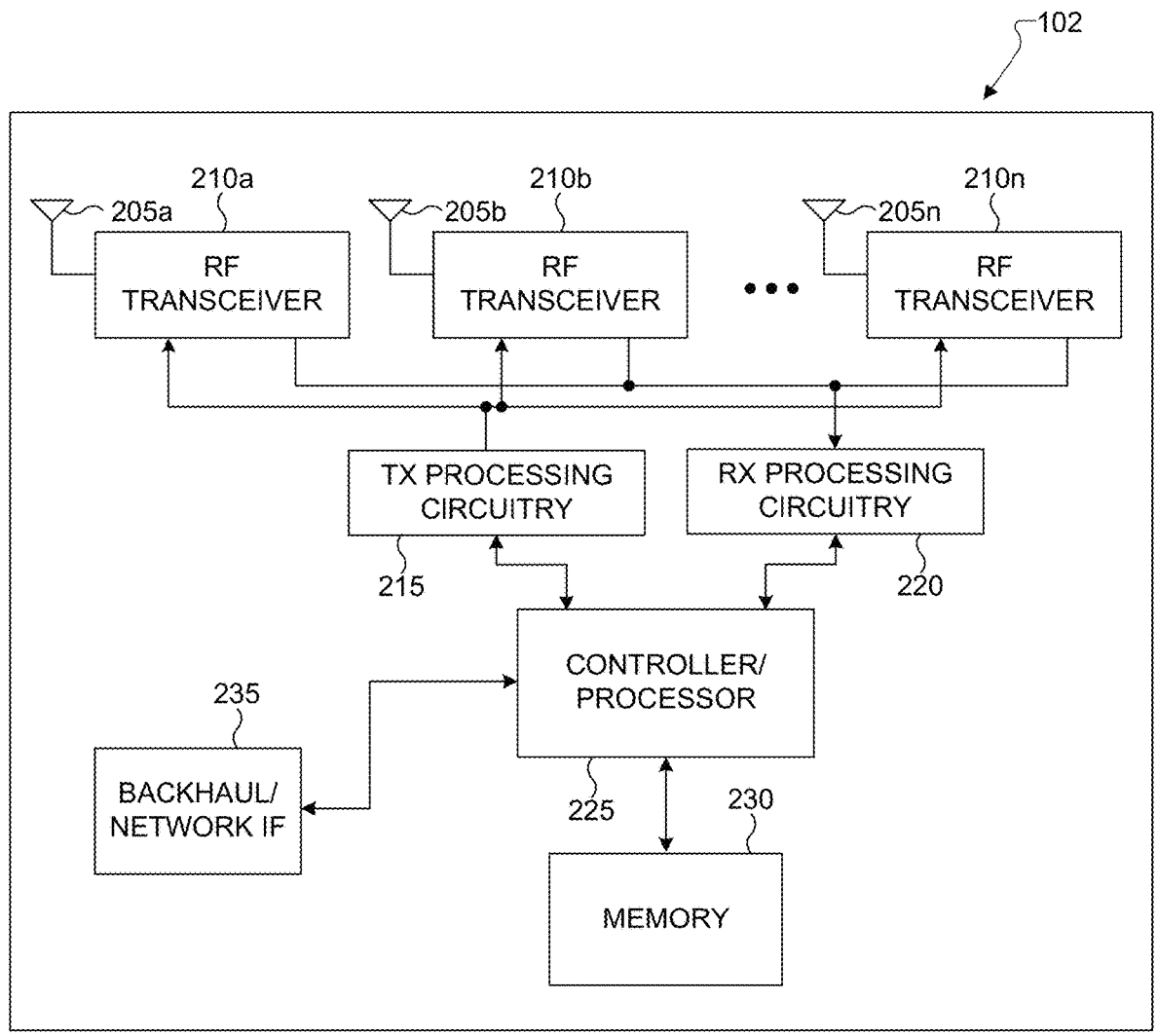
FIG. 2 illustrates an example gNB according to embodiments of the present disclosure.
Figure 3:
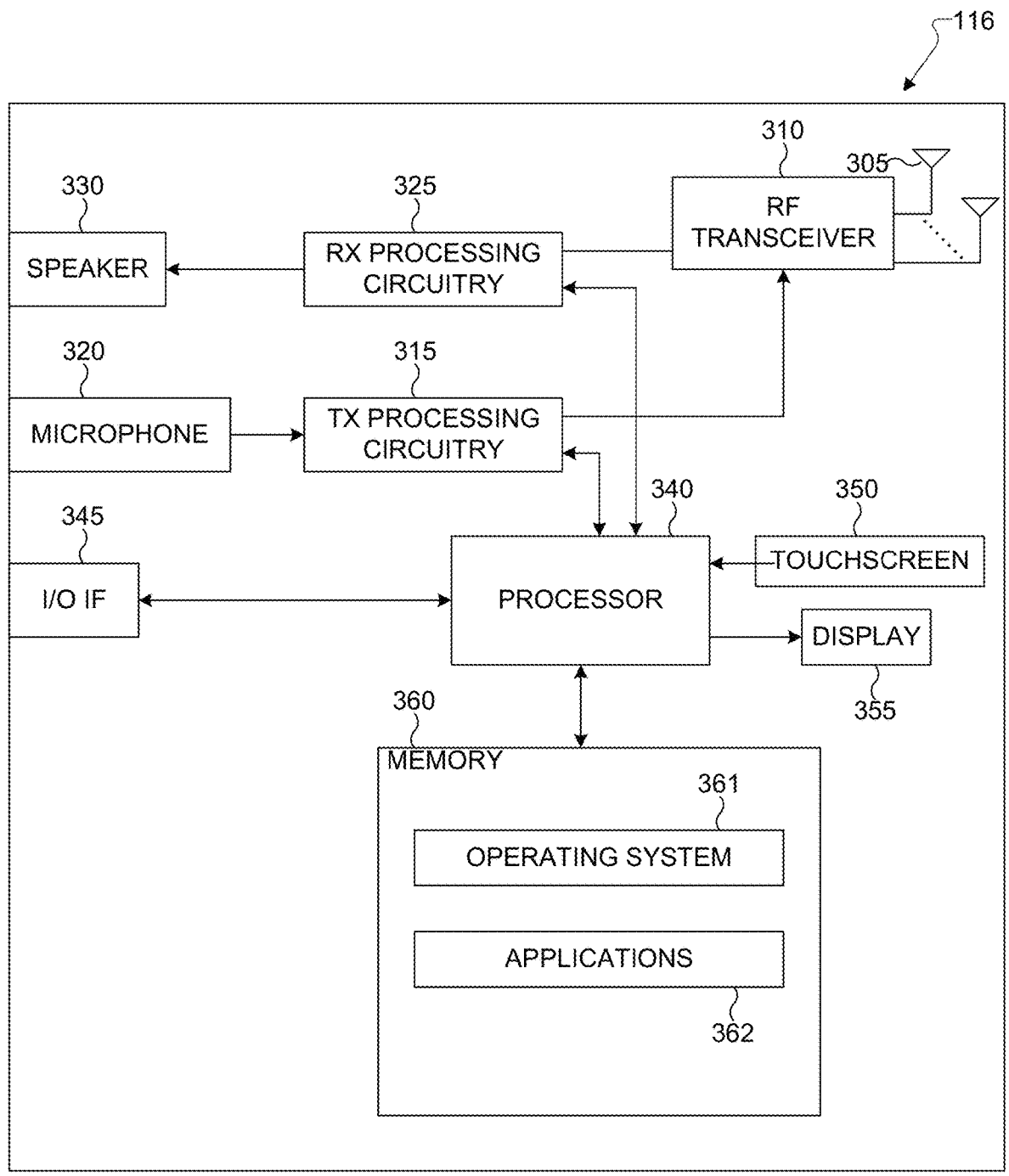
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using κG, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CSI construction in an advanced wireless communication system. In certain embodiments, and one or more of the gNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
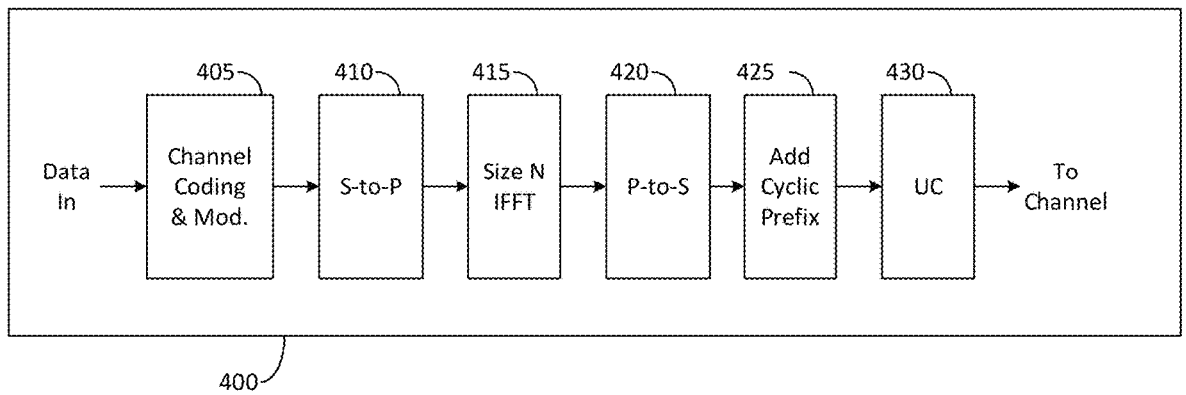
FIG. 4A illustrates a high-level diagram of an orthogonal frequency division multiple access transmit path according to embodiments of the present disclosure.
Figure 4B:
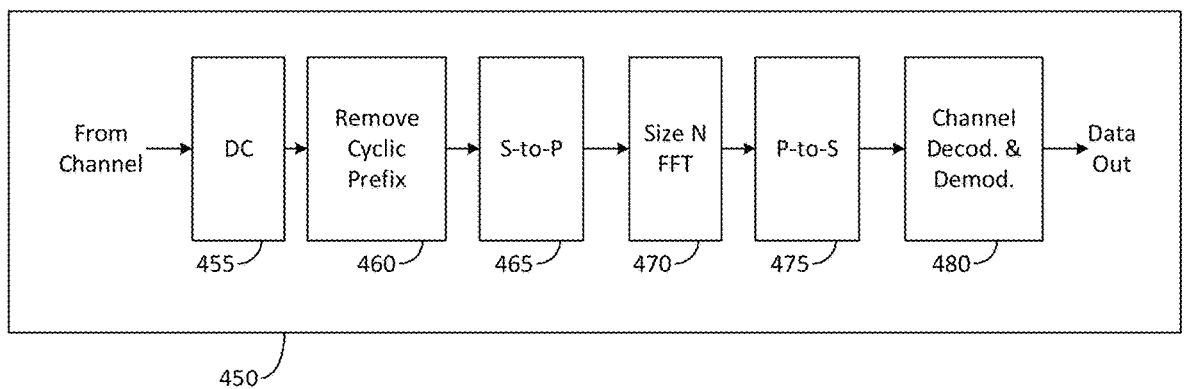
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a physical UL control channel (PUCCH). If a UE needs to transmit data information and UCI in a same UL subframe, the UE may multiplex both in a PUSCH. UCI includes hybrid automatic repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a resource block (RB). A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot 19 \cdot (N_{symb}^{UL} - 1) - N_{SRS}$, where $N_{SRS}=1$ if a last subframe symbol is used to transmit SRS and $N_{SRS}=0$ otherwise.

Figure 5:
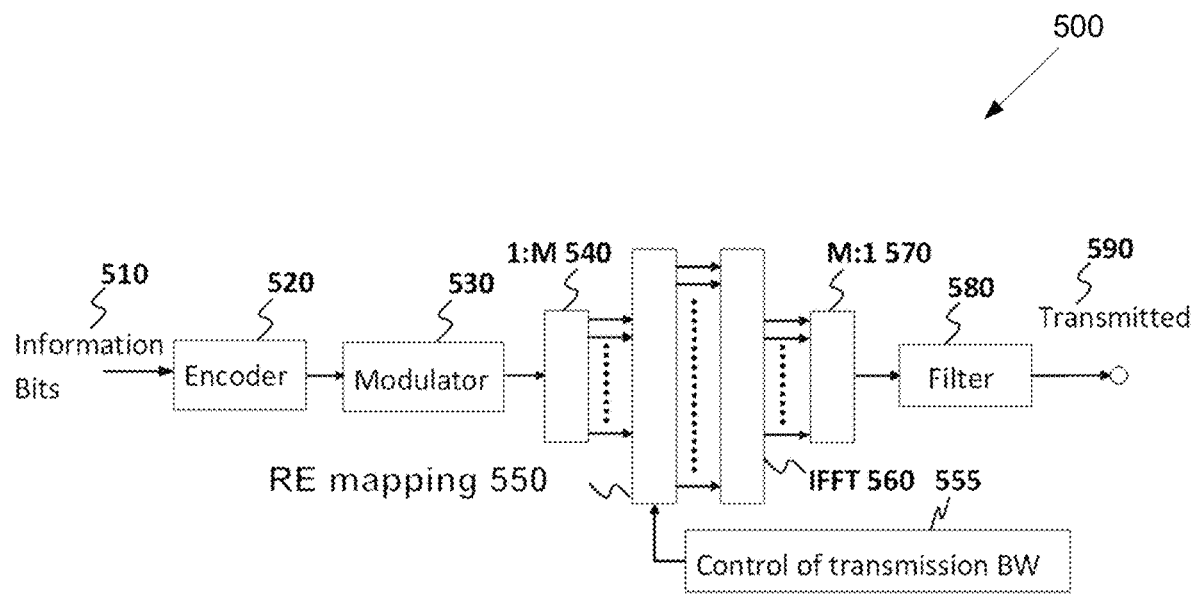
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
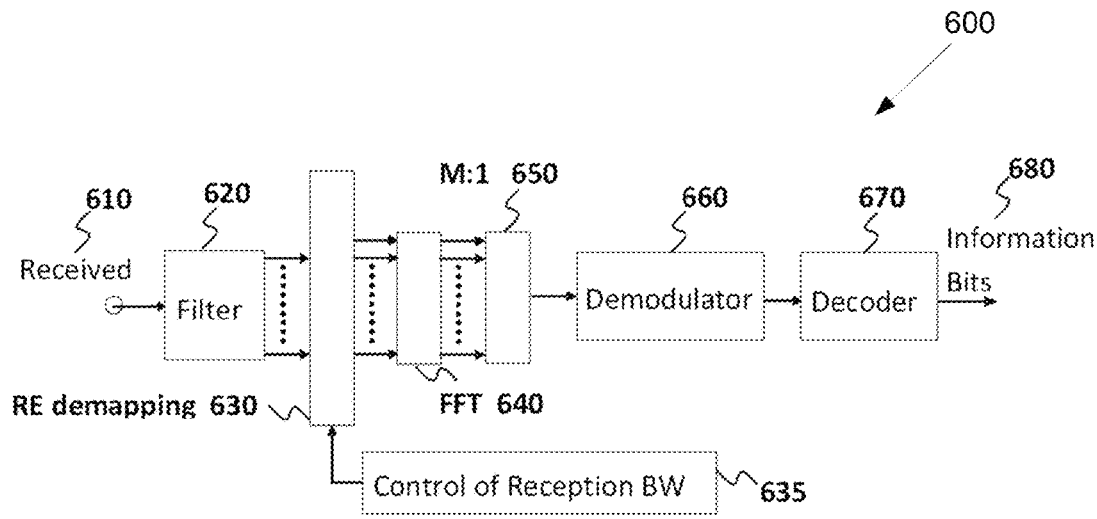
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
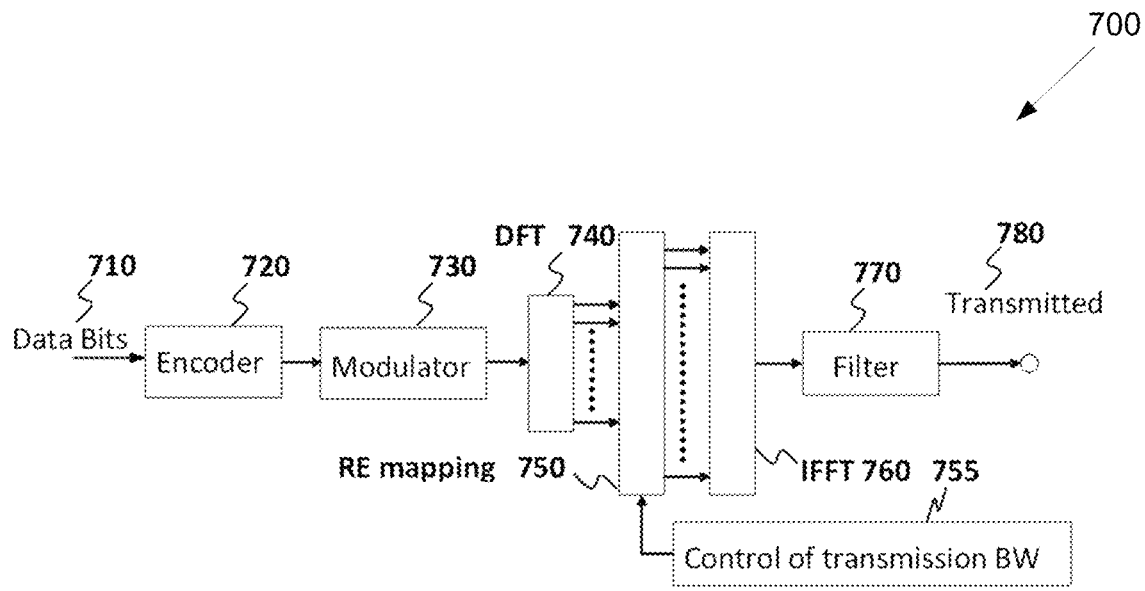
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
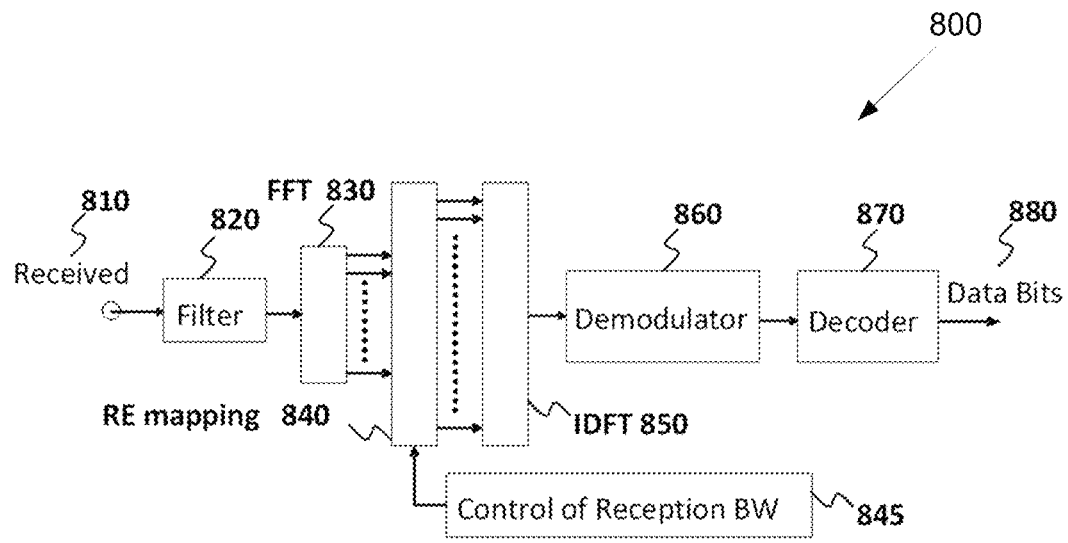
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9A:
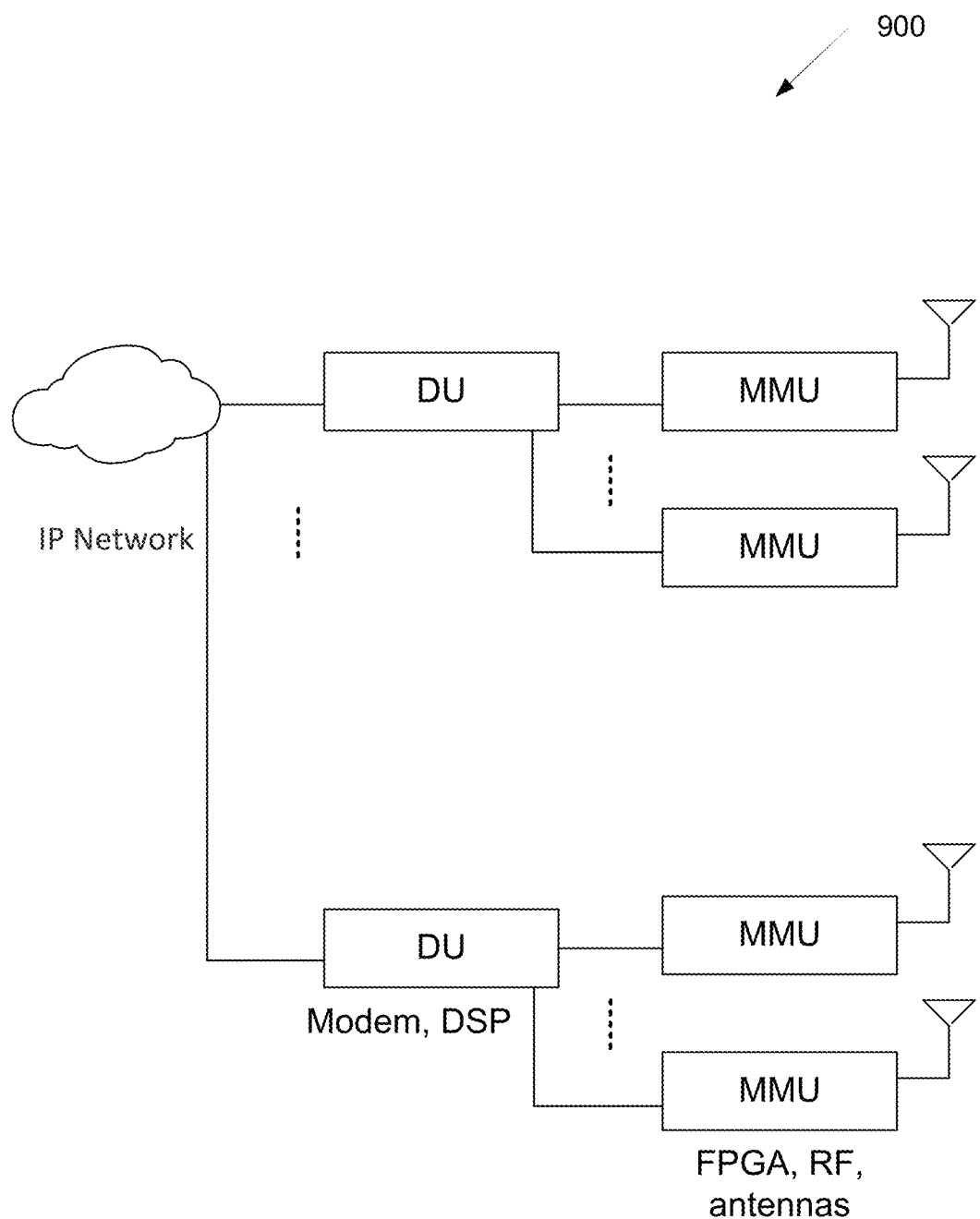
FIG. 9A illustrates an example a network architecture supporting massive MIMO transmissions and receptions according to embodiments of the present disclosure.

FIG. 9A illustrates an example a network architecture 900 supporting massive MIMO transmissions and receptions according to embodiments of the present disclosure. The embodiment of the network architecture 900 illustrated in FIG. 9A is for illustration only. FIG. 9A does not limit the scope of the present disclosure to any particular implementation.

FIG. 9A illustrates a network architecture supporting massive MIMO transmissions and receptions according to some embodiments of the present disclosure. A data unit (DU) interfaces backhaul to an IP network, and the DU supports multiple massive multi-input-multi-output (MIMO) units (MMUs). DU is equipped with at least one of modems, digital signal processors (DSPs) field programmable gate array (FPGAs), and memory units, and processes information bits to generate intermediate signals and pass them over to MMU, so that the information bits are converted to radio signals in MMU. The radio signals are transmitted via massive MIMO antennas comprising the MMU. MMU may also have processing power, in which case, MMU may also comprise modems, DSPs, FPGAs, and memory units, in addition to radio frequency (RF) hardware and massive MIMO antennas.

In some embodiments, DU and MMU handle the following 5 layers: PDCP, RLC, MAC, PHY, and RF. The layers are split into two groups of consecutive layers, and the two groups are separately handled respectively by DU and MMU. This is called "functional split," and different functional split methods allows for different tradeoff in implementation complexity, cost, etc. In one example, DU handles PDCP, RLC, MAC, and a first function of PHY; and MMU handles a second function of PHY and RF. In another example, DU handles only PDCP, and the rest (i.e., RLC, MAC, PHY and RF) are handled by MMU.

Figure 9B:
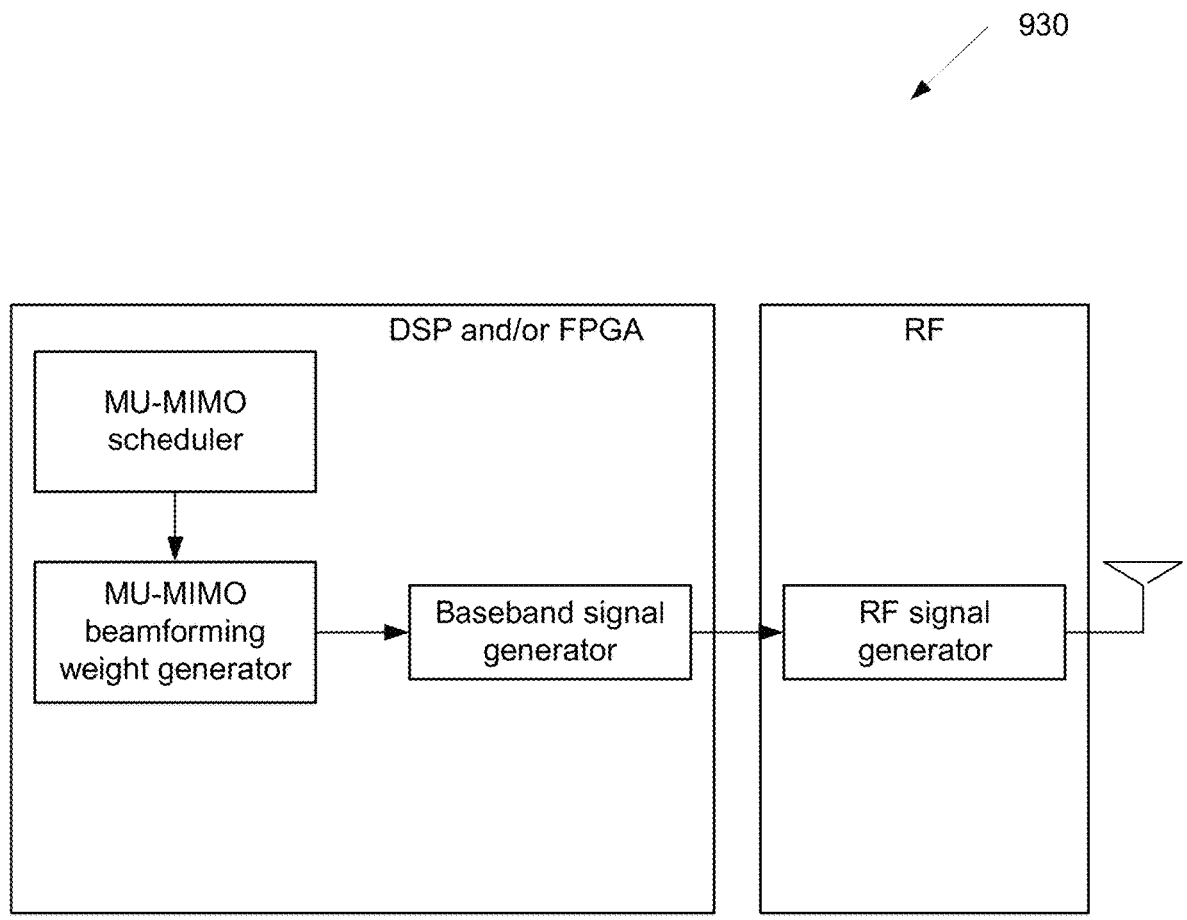
FIG. 9B illustrates an example MU-MIMO baseband signal generation according to embodiments of the present disclosure.

FIG. 9B illustrates an example MU-MIMO baseband signal generation 930 according to embodiments of the present disclosure. The embodiment of the MU-MIMO baseband signal generation 930 illustrated in FIG. 9B is for illustration only. FIG. 9B does not limit the scope of the present disclosure to any particular implementation.

In some embodiments, multi-user MIMO (MU-MIMO) beamforming processing is performed in DSP and/or FPGA, with utilizing the memory units. This processing may happen in DU and/or MMU. The beamforming weights generated by the output of the beamforming module are applied to data modulation symbols of the scheduled users in the frequency domain, and the baseband time domain signals constructed in the MMU and converted to RF signals. The RF signals are transmitted via massive MIMO antennas.

For supporting up to two-layer transmission per UE in MU-MIMO transmissions, the BS needs to have up to two-layer CSI per UE. The CSI comprises DL channel matrix for each frequency resource (e.g., resource block, or resource block group) and channel quality information (CQI) per layer. When BS has $N_r$ Tx/Rx (TRx) antennas, the dimension of the channel matrix is $N_r \times N_L$, where $N_L$ is the maximum number of layers to be transmitted for the UE in the MU-MIMO transmissions.

When some channel reciprocities exist between UL and DL channels, the BS can estimate the DL channel matrix by UL sounding, relying on the received sounding reference signals (SRS) at the BS antennas, where the SRS is transmitted by the UE according to the BS configuration. When perfect channel reciprocity holds, the BS could get DL channel matrix estimate, which is equal to the SRS-estimated UL channel matrix. When partial channel reciprocity holds, the BS get DL channel matrix estimate as a function of the SRS-estimated UL channel matrix, by processing the UL channel matrix. The SRS can be transmitted with transmit antenna switching (TAS) on, or with TAS off.

When TAS is on, the UE transmits SRS with switching UE TRx antennas in SRS transmission instances. For example, when TAS is on for two UE antennas, relying on UE SRS, the BS can estimate $N_r \times 2$ UL channel matrix per frequency resource.

When TAS is off, the UE transmits SRS with using the same UE antenna(s) in all the SRS transmission instances. In this case, when TAS is off for two UE antennas, relying on UE SRS, the BS can estimate $N_r \times 1$ UL channel matrix per frequency resource.

Currently, not all the LTE UE supports TAS on. Also, there are UEs who supports rank-2 reception but that does not support TAS. For those UEs which do not support TAS, more information than or processing on the $N_r \times 1$ UL channel matrix estimate would be necessary to schedule rank-2.

In the present disclosure, three embodiments are provided. The first embodiment provided a solution for predicting the $2^{nd}$ layer channel from the $1^{st}$ layer SRS when UEs do not support TAS. The second embodiment provides an algorithm to update rank-2 transmission decision at the BS side. In general, UEs report to the BS the rank the UEs can support (either rank-1 or rank-2). In the present disclosure, an algorithm is provided to update the rank-2 transmission decision at the BS side when UEs report rank-2.

If a UE reports rank-1, a BS follows UE reporting without any updating. The final embodiment addresses the PF metric calculation of rank-2 UEs focusing on the update of a parameter that guarantees semi-orthogonality between co-scheduled UEs.

In some embodiments, a solution is provided for coming up with multi-layer CSI (DL channel matrix and CQI) for the TAS-off UEs.

Figure 9C:
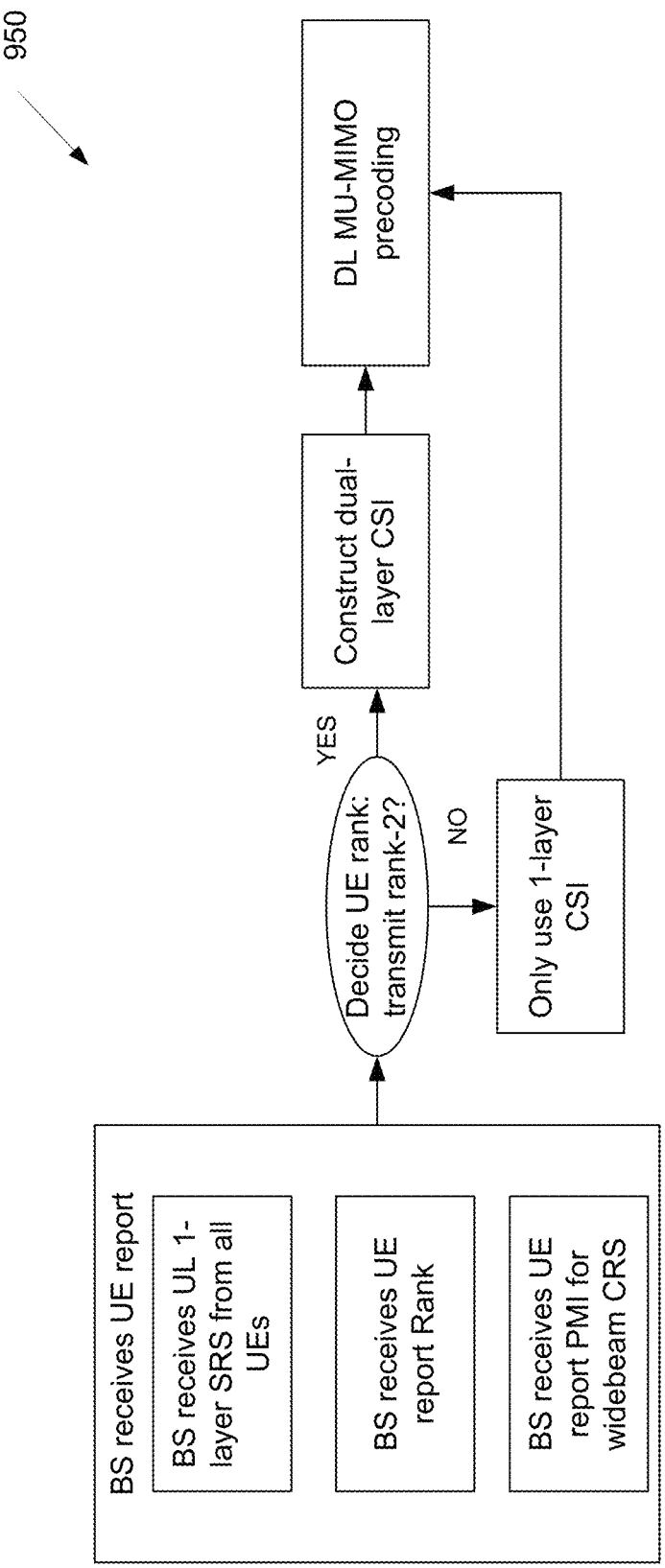
FIG. 9C illustrates an example BS operation for performing rank-2 adaptive MU-MIMO scheduling and precoding according to embodiments of the present disclosure.

FIG. 9C illustrates an example BS operation 950 for performing rank-2 adaptive MU-MIMO scheduling and precoding according to embodiments of the present disclosure. The embodiment of the BS operation 950 illustrated in FIG. 9C is for illustration only. FIG. 9C does not limit the scope of the present disclosure to any particular implementation.

FIG. 9C illustrates a BS operation for performing rank-2 adaptive MU-MIMO scheduling and precoding. The BS receives CSI feedback and SRS from the UE, and processes CSI feedback and SRS to derive CSI for the UE. After collecting CSI from multiple UE, the BS processes the CSI to decide MU-MIMO scheduling, derive MU-MIMO precoder, and decide MCS to be assigned to the multiple UE scheduled in the TTI.

The BS side receives each UE's SRS corresponding to $1^{st}$ layer CSI and receives CSI feedback on favorable rank (1 or 2), and PMI and CQI calculated based on CRS beam.

If a UE reports rank 2, the BS constructs dual-layer CSI for the UE. If a UE reports rank 1, the BS does not construct dual-layer CSI for the UE and uses UL SRS as the 1-layer CSI. The DL MU-MIMO scheduler and precoder takes all UE's CSI and rank as input, and computes MU-MIMO beamforming weight.

In the present disclosure, a construction of dual-layer CSI, using SRS and UE feedback CSI, is provided, and also a scheme to jointly design MU-MIMO precoder and $2^{nd}$ layer CSI is provided.

Without loss of generality, the present disclosure assumes the BS is equipped cross-polarization antennas, with equal number of antennas, $N_{co}$ (where $N_{co}$ is the number of co-pol antenna on BS side, equal to half of $N_{BS}$, the number of antennas at the $$BS: N_{co} = \frac{N_{BS}}{2}),$$

in both polarization directions.

Figure 10:
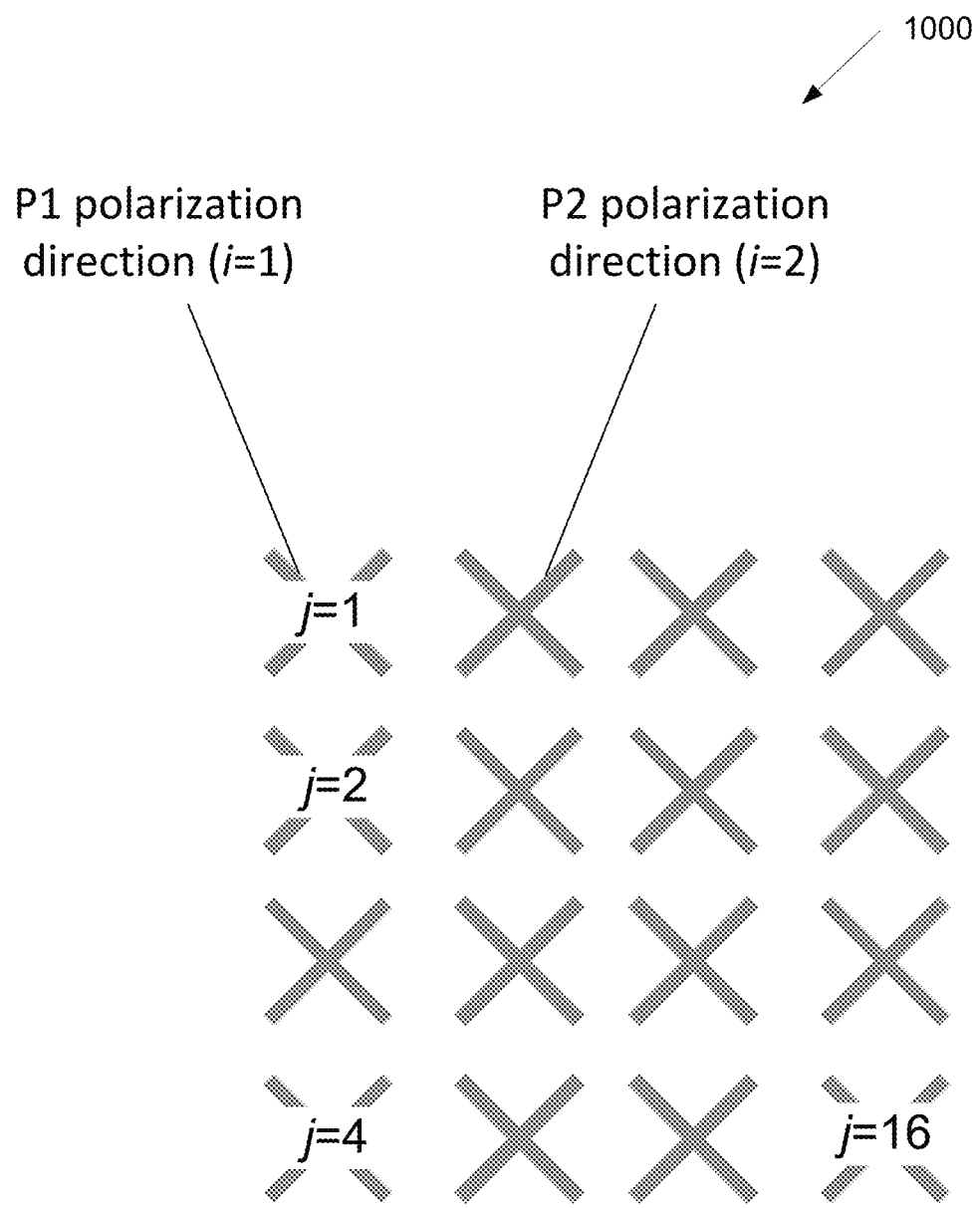
FIG. 10 illustrates an example polarization direction according to embodiments of the present disclosure.

FIG. 10 illustrates an example polarization direction 1000 according to embodiments of the present disclosure. The embodiment of the polarization direction 1000 illustrated in FIG. 10 is for illustration only. FIG. 10 does not limit the scope of the present disclosure to any particular implementation.

Denote the SRS channel coefficients from the UE Tx antenna to the 2 BS polarization directions as $P_1$ and $P_2$ respectively:

$$P_1 = \begin{bmatrix} h_{1,1} \\ h_{1,2} \\ \vdots \\ h_{1,N_{co}} \end{bmatrix}, P_2 = \begin{bmatrix} h_{2,1} \\ h_{2,2} \\ \vdots \\ h_{2,N_{co}} \end{bmatrix}$$

were, $h_{i,j}$ denotes a complex channel coefficient corresponding to BS antenna (i,j), where i is a polarization index, j is an antenna position index.

In one embodiment, rank-2 channel reconstruction is provided according to the antenna polarization modeling.

Figure 11:
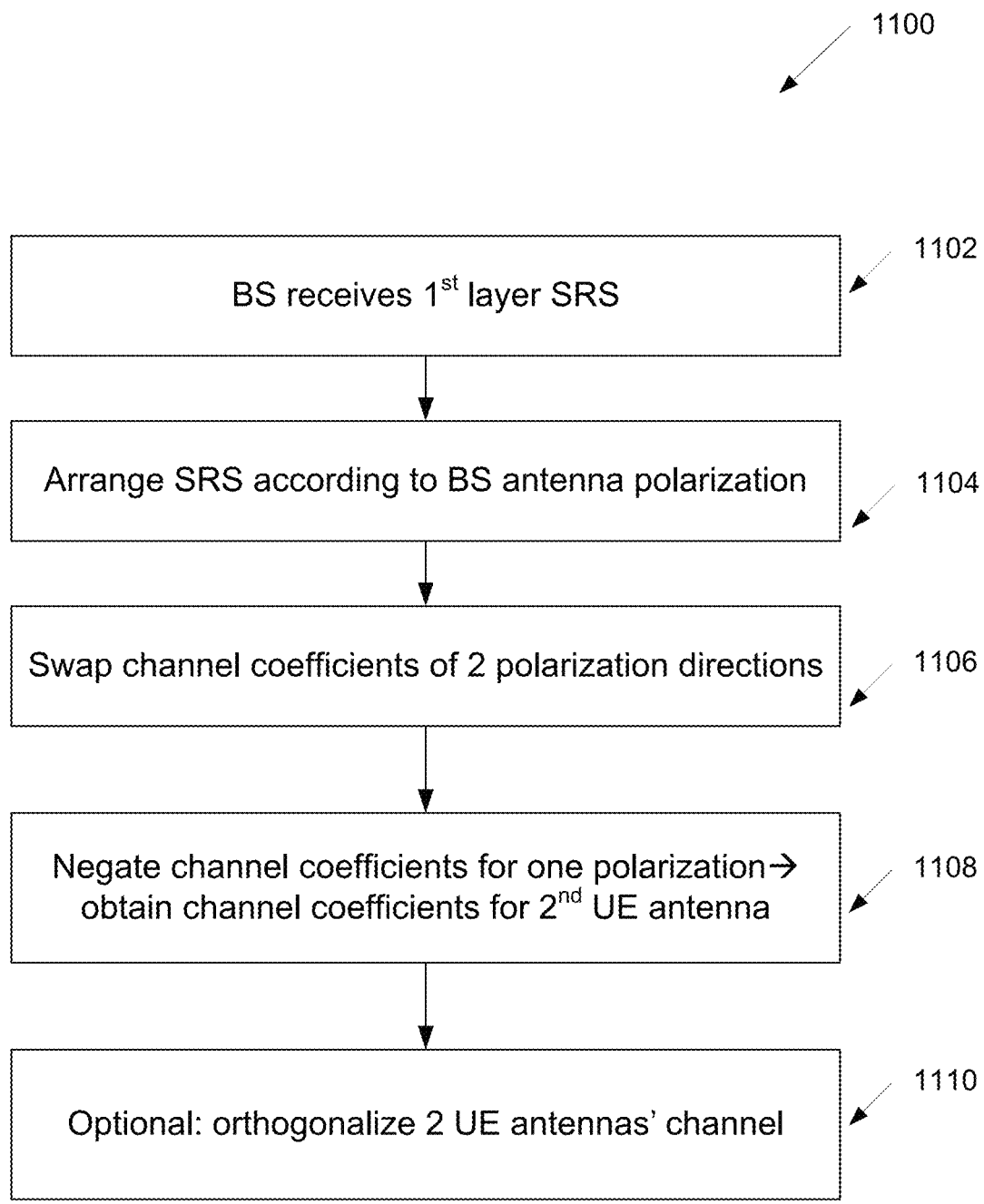
FIG. 11 illustrates an example rank-2 channel reconstruction according to embodiments of the present disclosure.

FIG. 11 illustrates an example rank-2 channel reconstruction 1100 according to embodiments of the present disclosure. The embodiment of the rank-2 channel reconstruction 1100 illustrated in FIG. 11 is for illustration only. FIG. 11 does not limit the scope of the present disclosure to any particular implementation.

As illustrated in FIG. 11, a BS in step 1102 receives $1^{st}$ layer SRS. In step 1104, the BS arranges SRS according to BS antenna polarization. In step 1106, the BS swaps channel coefficients of 2 polarization directions. Subsequently, the BS in step 1108 negates channel coefficients for one polarization obtain channel coefficients for $2^{nd}$ UE antenna. Finally, the BS orthogonalizes 2 UE antennas' channel in step 1110. The step 1110 may be an optional operation for the BS.

Suppose that the SRS channel estimates for the two polarized antenna array is denoted as a column vector $$H_1 = \begin{bmatrix} P_1 \\ P_2 \end{bmatrix} \cdot A$$

$2^{nd}$ layer channel vector can be constructed by swapping the polarization channel coefficient and multiplying −1 in one of the polarization direction, i.e. $H_2 = \begin{bmatrix} P_2 \\ -P_1 \end{bmatrix}$ or $H_2 = \begin{bmatrix} -P_2 \\ P_1 \end{bmatrix}$.

A channel state matrix can be obtained by concatenating the $1^{st}$ and $2^{nd}$ vectors, i.e. $W = [w_1, w_2] = \begin{bmatrix} P_1 & P_2 \\ P_2 & -P_1 \end{bmatrix}$ or $\begin{bmatrix} P_1 & -P_2 \\ P_2 & P_1 \end{bmatrix}$.

Normalize the 2 vectors separately, $$\overline{W} = [\overline{w}_1, \overline{w}_2], \overline{w}_1 = \frac{w_1}{|w_1|}, \overline{w}_2 = \frac{w_2}{|w_2|}.$$

In one embodiment, the above matrix $\overline{W} = [\overline{w}_1, \overline{w}_2]$, can be used as dual-layer CSI for a UE. For all UEs reporting rank-2, the $\overline{W}$ is computed, and used as input to MU-MIMO precoder.

In another embodiment, one can perform SVD to above matrix W, and use 2 dominant left eigenvectors $[w_1, w_2]$ as dual-layer CSI of a UE: $USV^H = [w_1, w_2]$ where $$U = \begin{bmatrix} u_{1,1} & u_{1,2} & \cdots & u_{1,N_{BS}} \\ u_{2,1} & u_{2,2} & \cdots & u_{2,N_{BS}} \\ \vdots & \vdots & \vdots & \vdots \\ u_{N_{BS},1} & u_{N_{BS},1} & \cdots & u_{N_{BS},N_{BS}} \end{bmatrix},$$

and S is a diagonal matrix, where the diagonal components are all non-negative real number, and ordered in a descending order from left to right. Then the CSI used for precoding can be constructed as $$\tilde{w}_1 = \begin{bmatrix} u_{1,1} \\ u_{2,1} \\ \vdots \\ u_{N_{BS},1} \end{bmatrix}, \tilde{w}_2 = \begin{bmatrix} u_{1,2} \\ u_{2,2} \\ \vdots \\ u_{N_{BS},1} \end{bmatrix},$$

and the normalized channel vectors are $$\overline{W} = [\overline{w}_1, \overline{w}_2], \overline{w}_1 = \frac{\tilde{w}_1}{|\tilde{w}_1|}, \overline{w}_2 = \frac{\tilde{w}_2}{|\tilde{w}_2|}.$$

In one embodiment, rank-2 channel reconstruction with least-square fitting is provided.

For a UE, decompose the UE's 1-SRS CSI according to BS polarization direction, i.e., $H_1 = \begin{bmatrix} P_1 \\ P_2 \end{bmatrix}$, where $P_1, P_2 \in \mathbb{C}^{N_{co} \times 1}$. Find the common dominant eigen direction from empirical channel covariance $$\text{matrix } C' = \frac{1}{2N_{Co}}(\Sigma_k(P_1)^H P_1 + \Sigma_k(P_2)^H P_2),$$

and denote as $V'_1$.

Find two parameters $\alpha_1$, $\alpha_2$ that solves the following LS problem: Minimize $E = \Sigma_k(\|\alpha_1 V'_1 - P_1\|^2 + \|\alpha_2 V'_1 - P_2\|^2)$.

One feasible solution is $$\alpha_1 = \frac{\Sigma_k (V'_1)^H P_1}{N_{Co} \|V'_1\|^2}, \quad \alpha_2 = \frac{\Sigma_k (V'_1)^H P_2}{N_{Co} \|V'_1\|^2}.$$

$V'_1$ may be further optimized for LS fitting using $\alpha_1$ and $\alpha_2$. Then, the rank-2 precoding vector is constructed as $$[w_1 \ w_2] = \frac{1}{\sqrt{|\alpha_1|^2 + |\alpha_2|^2}} \begin{bmatrix} \alpha_1 V'_1 & -\alpha_2 V'_1 \\ \alpha_2 V'_1 & \alpha_1 V'_1 \end{bmatrix}.$$

SVD may be further applied on the reconstructed rank-2 channel to further orthogonalize the precoder.

In one embodiment, rank-2 channel reconstruction using 1-layer CSI's singular vector is provided.

Figure 12:
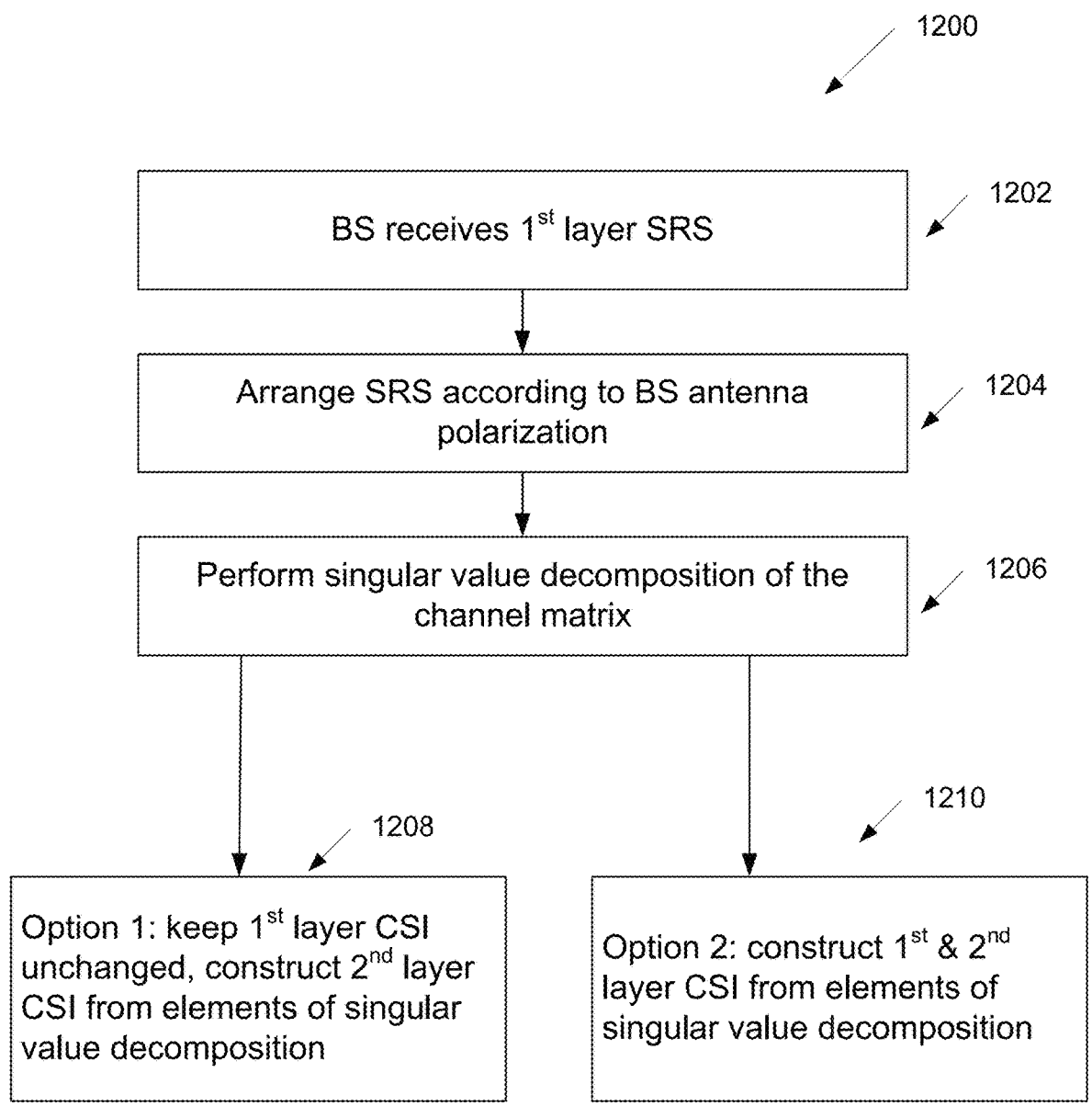
FIG. 12 illustrates another example rank-2 channel reconstruction according to embodiments of the present disclosure.

FIG. 12 illustrates another example rank-2 channel reconstruction 1200 according to embodiments of the present disclosure. The embodiment of the rank-2 channel reconstruction 1200 illustrated in FIG. 12 is for illustration only. FIG. 12 does not limit the scope of the present disclosure to any particular implementation.

As illustrated in FIG. 12, the BS in step 1202 receives $1^{st}$ layer SRS. Subsequently, the BS in step 1204 arranges SRS according to BS antenna polarization. Subsequently, the BS in step 1206 performs singular value decomposition of the channel matrix to find dominant directions among co-pol antennas and dominant directions among cross-pol antennas. As illustrated in FIG. 12, there may be two options. In option 1 of step 1208, the BS keeps $1^{st}$ layer CSI unchanged, construct $2^{nd}$ layer CSI from elements of singular value decomposition. In option 2 of step 1210, the BS constructs $1^{st}$ and $2^{nd}$ layer CSI from elements of singular value decomposition.

Suppose that the SRS channel estimates for the two polarized antenna array is denoted as a column vector $$H_1 = \begin{bmatrix} P_1 \\ P_2 \end{bmatrix},$$

where $P_1, P_2 \in C^{N_{co} \times 1}$. Concatenating $P_1$, $P_2$ into a $N_{co} \times 2$ matrix, and perform SVD, obtain $$USV^H = \begin{bmatrix} h_{1,1} & h_{2,1} \\ h_{1,2} & h_{2,2} \\ \vdots & \vdots \\ h_{1,N_{co}} & h_{2,N_{co}} \end{bmatrix} \text{ where } U = \begin{bmatrix} u_{1,1} & u_{1,2} & \cdots & u_{1,N_{co}} \\ u_{2,1} & u_{2,2} & \cdots & u_{2,N_{co}} \\ \vdots & \vdots & \vdots & \vdots \\ u_{N_{co},1} & u_{N_{co},1} & \cdots & u_{N_{co},N_{co}} \end{bmatrix}$$

is a $N_{co} \times N_{co}$ matrix, the dominant two columns represent the directions of the channel; and $$V^H = \begin{bmatrix} v_{1,1} & v_{1,2} \\ v_{2,1} & v_{2,2} \end{bmatrix}$$

is a 2×2 matrix, each row represent the co-phase information between 2 BS antenna directions.

In one embodiment, the $1^{st}$ layer CSI ($H_1$) is kept same as SRS, and $2^{nd}$ layer CSI ($H_2$) is constructed using elements of U, S, $V^H$.

In one example of this embodiment, $2^{nd}$ layer CSI is constructed using $1^{st}$ dominant channel direction vector, and the $2^{nd}$ co-phase vector, $$\text{i.e., } H_2 = \begin{bmatrix} \begin{bmatrix} u_{1,1} \\ u_{2,1} \\ \vdots \\ u_{N_{co},1} \end{bmatrix} v_{2,1} \\ \begin{bmatrix} u_{1,1} \\ u_{2,1} \\ \vdots \\ u_{N_{co},1} \end{bmatrix} v_{2,2} \end{bmatrix}.$$

The normalized CSI vectors are $$[w_1, w_2] = \left[\frac{H_1}{|H_1|}, \frac{H_2}{|H_2|}\right].$$

In another example, $2^{nd}$ layer CSI is constructed using $1^{st}$ dominant channel direction vector, and 2 co-phase vectors, with different weighting, i.e., $$H_2 = \begin{bmatrix} \begin{bmatrix} u_{1,1} \\ u_{2,1} \\ \vdots \\ u_{N_{co},1} \end{bmatrix} (v_{2,1}\sigma_1 + v_{1,1}\sigma_2) \\ \begin{bmatrix} u_{1,1} \\ u_{2,1} \\ \vdots \\ u_{N_{co},1} \end{bmatrix} (v_{2,2}\sigma_1 + v_{1,2}\sigma_2) \end{bmatrix}$$

where the weighting factors $\sigma_1 > \sigma_2$, one option is to choose the $1^{st}$ and $2^{nd}$ dominant singular values as $\sigma_1$, $\sigma_2$ respectively. The dual-layer CSI is constructed as $$[w_1, w_2] = \left[\frac{H_1}{|H_1|}, \frac{H_2}{|H_2|}\right].$$

In another embodiment, 2 layers' CSI are constructed to be orthogonally from the elements of U, S, $V^H$. In one example, the 2 layers are constructed using $1^{st}$ channel direction vector, and 2 co-phase vectors separately, i.e., $$H_1 = \begin{bmatrix} \begin{bmatrix} u_{1,1} \\ u_{2,1} \\ \vdots \\ u_{N_{co},1} \end{bmatrix} v_{11} \\ \begin{bmatrix} u_{1,1} \\ u_{2,1} \\ \vdots \\ u_{N_{co},1} \end{bmatrix} v_{12} \end{bmatrix}, H_2 = \begin{bmatrix} \begin{bmatrix} u_{1,1} \\ u_{2,1} \\ \vdots \\ u_{N_{co},1} \end{bmatrix} v_{21} \\ \begin{bmatrix} u_{1,1} \\ u_{2,1} \\ \vdots \\ u_{N_{co},1} \end{bmatrix} v_{22} \end{bmatrix}.$$

The dual-layer CSI is constructed as $$[w_1, w_2] = \left[ \frac{H_1}{|H_1|}, \frac{H_2}{|H_2|} \right].$$

In one embodiment, joint design of MU MIMO precoder and $2^{nd}$ layer CSI is provided.

Figure 13:
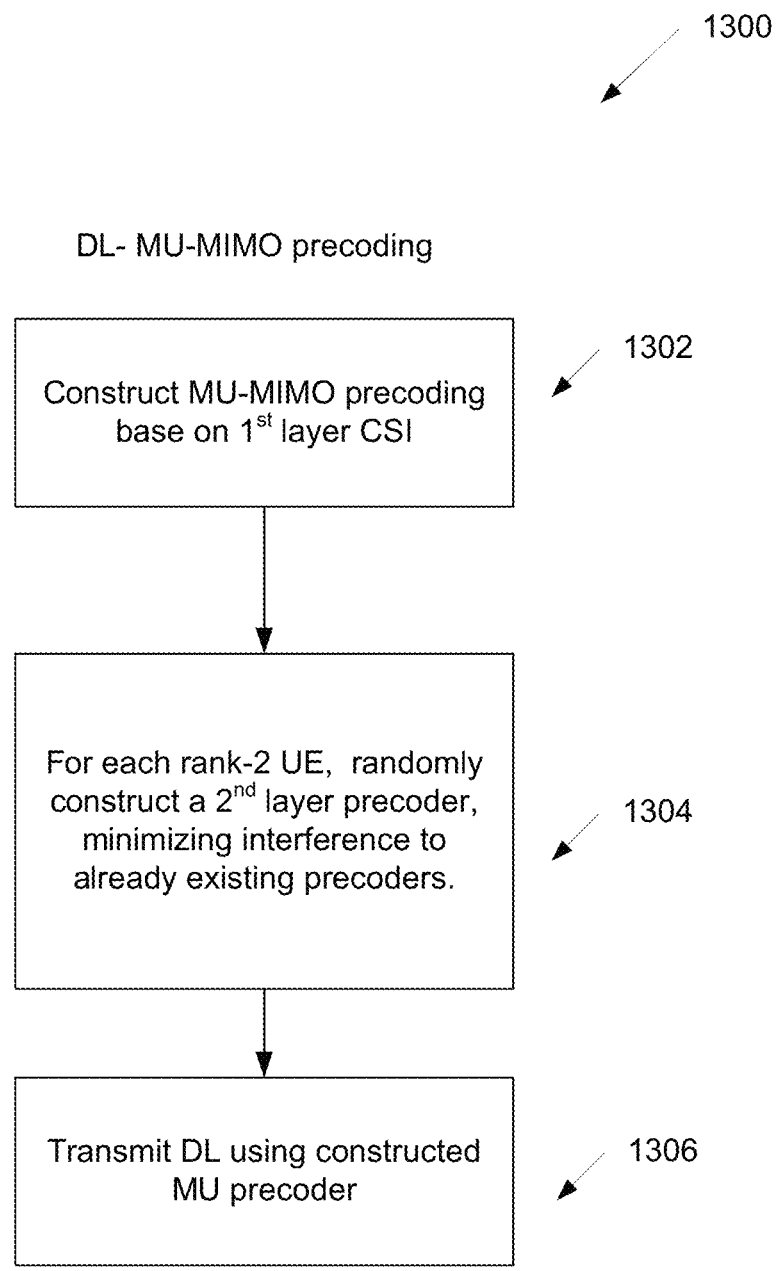
FIG. 13 illustrates an example joint design of MU MIMO precoder and $2^{nd}$ layer CSI according to embodiments of the present disclosure.

FIG. 13 illustrates an example joint design of MU MIMO precoder and $2^{nd}$ layer CSI 1300 according to embodiments of the present disclosure. The embodiment of the joint design of MU MIMO precoder and $2^{nd}$ layer CSI 1300 illustrated in FIG. 13 is for illustration only. FIG. 13 does not limit the scope of the present disclosure to any particular implementation.

As illustrated in FIG. 13, for the DL-MU-MIMO precoding and $2^{nd}$ layer CSI, MU-MIMO precoding is constructed base on $1^{st}$ layer CSI in step 1302. Next, in step 1304, for each rank-2 UE, a $2^{nd}$ layer precoder is randomly constructed to minimize interference to already existing precoders. Finally, in step 1306, DL is transmitted using constructed MU precoder.

Conventional MU-MIMO precoder takes all UEs' all layers' CSI as input. In this method, MU-MIMO precoder is computed first based on 1-layer CSI of each UE, denoted as $[c_{1,1}, c_{2,1}, \ldots c_{N_{UE},1}]$. Then for each UE suitable for rank-2, randomly construct a $2^{nd}$ layer precoder denoted as $[c_{p_{UE},2}, c_{m_{UE},2}, \ldots c_{n_{UE},2}]$, such that $c_{i_{UE},2}$ is orthogonal to the $1^{st}$ layer precoder $c_{i_{UE},1}$, while not causing too much interference to all the other UEs' existing precoder.

Figure 14:
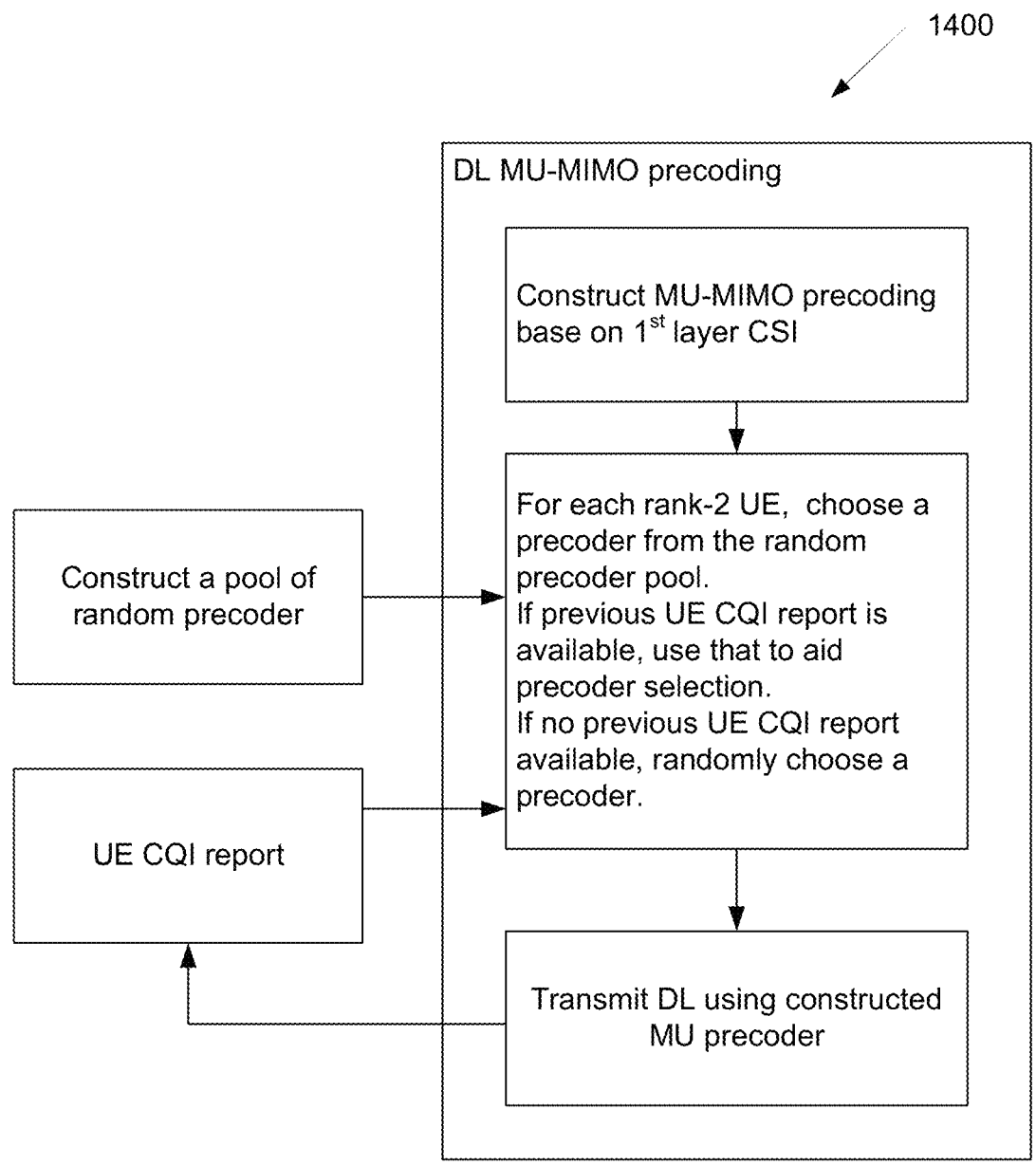
FIG. 14 illustrates another example joint design of MU MIMO precoder and $2^{nd}$ layer CSI according to embodiments of the present disclosure.

FIG. 14 illustrates another example joint design of MU MIMO precoder and $2^{nd}$ layer CSI 1400 according to embodiments of the present disclosure. The embodiment of the joint design of MU MIMO precoder and $2^{nd}$ layer CSI 1400 illustrated in FIG. 14 is for illustration only. FIG. 14 does not limit the scope of the present disclosure to any particular implementation.

In one example, randomly assign a pool of orthogonal random MU-precoders. In each operation cycle i=1, 2, . . . , for each rank-2 UE j=1, 2, . . . $N_{UE,rank2}$, assign a $2^{nd}$ layer precoder $c_{i,j}$ from the pool. The precoder assigned and CQI reported at each cycle are recorded. After a few cycles, the BS can use the record to decide the best set of rank-2 precoders.

In general, if a UE can support rank-2, the UE reports back to the BS if the UE's channel conditions can support rank-2 transmission (i.e., 2-layer transmission). If a UE reports rank-1 to BS, the BS can do nothing other than assign rank-1 for this UE. On the contrary, if a UE reports rank-2 to BS, then the BS side can either use the feedback rank or over-ride the UE rank to be rank-1 and performs single layer transmission.

In one example, a rank adaptation algorithm is provided where the BS can decide whether to schedule UEs reporting rank-2 for a single layer and a two-layer transmission (i.e., over-riding the feedback rank to be rank-1 or obeying the feedback rank-2).

Using simulations, it is clear that enabling rank-2 is only advantageous when there is a medium/low network loading. But in the case of full-buffer, it is always best to use rank-1 transmission. The algorithm first starts by checking the number of UEs that are ready for a new transmission. If this number is larger than a certain threshold (say more than 2 UEs ready to be scheduled for a new transmission), then all feedback rank may be over-ridden to be rank-1. The reason is that this case is more towards the full-buffer scenario, If the number of UEs that are ready to be scheduled for a new transmission is less than or equal to the set threshold, then each layer of each UE is considered as a separate UE. Then it is the job of the scheduler whether to scheduler the first layer, the second layer, or both layers of a UE that reported rank-2 in the feedback.

In one embodiment, the algorithm can be summarized as follows.

In step 1, check the number of UEs that are ready to be scheduled. If larger than 2, go to step 2, otherwise, go to step 3.

In step 2, over-ride all rank-2 UEs to be rank-1.

In step 3, treat all rank-2 UEs as if the rank-2 UEs were two separate UEs. Therefore, the number of UEs that are ready to be scheduled increases by X, where X is the number of rank-2 UE. Hence, X is the job of the scheduler to decide which layers of which UEs are to be scheduled.

For TM7 and TM8, multiple UEs can be co-scheduled together to utilize the MU-MIMO gain. For efficient selection of the UEs that are to be scheduled together, some orthogonality needs to be maintained while deciding based on the proportional fair (PF) metric. In such embodiment, it may be explained how to maintain semi-orthogonality when selecting co-scheduled UEs among a set of rank-1 and rank-2 UEs.

A prescheduling user set is initialized to be an empty set. As the algorithm progresses, the scheduling algorithm adds a user in the prescheduling user set, one by one; and keeps track of (1) "signals space" contributed by the so-far selected users' channels and (2) orthogonality measure of the individual remaining users $\gamma_i$ who have not yet been selected to the constructed signal space. When adding a user, the algorithm expands the signal space with spanning the space with a new vector that is aligned with the channel of the newly added user and orthogonal to the previously chosen signal space; and the algorithm updates the parameter $\gamma_i$. $\gamma_i$ value for user i is updated by subtracting the magnitude of the projected channel vector to the signal space, from the original $\gamma_i$ value.

The parameter $\gamma$ may be used as a measure of orthogonality of a channel of a remaining user to the signal subspace. The higher the value of $\gamma$ for a certain user, the more orthogonal this user is to the set of previously chosen users. $\gamma$ values may be initialized for each UE considering all the layers as reported from a UE side to BS side. Initialization of $\gamma_i=1$ for all users is done in the beginning.

For rank-2 users, existing algorithms treat each layer as a separate user and update $\gamma$ for each layer separately. This may lead to scheduling some users as rank-1 users (by scheduling only one of two layers) although their feedback suggested scheduling them as rank-2 users. The provided algorithm does not treat layers of the same user as separate UEs. The provided algorithm updates $\gamma$ values for the user as a whole considering both layers. Therefore, when adding a rank-2 user, the signal space is expanded by adding two vectors aligned with the channels of the two added layers and both are orthogonal to the previously chosen signal space. Also, the γ values of rank-2 users are updated differently by subtracting the sum of the magnitudes of the projection of the channel of each layer to the signal space. Treating layers of rank-2 users jointly and not as separate UEs has a better throughput performance in case of low and medium network loading.

The following steps summarize how the algorithm work.

In 1/3) initialization step, γ values are initialized for each UE considering all layers as reported from UE side to BS side. Initialization of $\gamma_i=1$ for all users is done in the beginning. The first user in the semi-orthogonal set of users is selected by: index of the firstly chosen UE:

$$i_1 = \underset{i}{\operatorname{argmax}} \sum_{j=1}^{Rank\ of\ UE\ i} \|\bar{h}_{i,j}\|^2$$

and direction of the firstly chosen layers:

$$a_{0,j} = \frac{h_{i_1,j}}{\|h_{i_1,j}\|}, j = 1$$

for rank-1 UEs or, j=1, 2 for rank-2 UEs.

In 2/3) update step, after selecting the first user ($\ell$=1) in the semi-orthogonal set, all $\gamma_i$ values are updated to estimate the orthogonality of the remaining users to the first chosen user. Therefore, it may be given by $\gamma_i = \gamma_i - \sum_{j=1}^{Rank\ of\ UE_i} |\bar{h}_{i,j}^H a_{\ell-1,j}|^2$, $i \neq i_1$ where $$a_{\ell,j} = \frac{1}{\sqrt{\gamma_{i_\ell}}} \left( \bar{h}_{i_\ell,j}^T - \sum_{j=1}^{Rank\ of\ i^{th}\ UE} \bar{h}_{i_\ell,j}^T a_{q,j}^H a_{q,j} \right)$$

In 3/3) selection step, the single user PF metric ($PF^{SU}$) is then updated using the updated values of $\gamma_i$'s to be $$PF_i^{SU} = \sum_{j=1}^{Rank\ of\ i^{th}\ UE} \log_2\left(1 + \frac{\gamma_i SINR_{i,j} \cdot (Outer\ loop)_{i,j}}{avgSINR}\right)$$

In this step, the orthogonality effect (represented by $\gamma_i$) may be added to the conventional single-user PF metric calculation.

The newly added user may be the one with the highest $PF_i^{SU}$. Hence, $$i^* = \underset{i \in \{remaining\ UEs\}}{\operatorname{argmax}} PF_i^{SU}.$$

Users can be added until the maximum number of users to be included in the semi-orthogonal user-set is reached.

Figure 15:
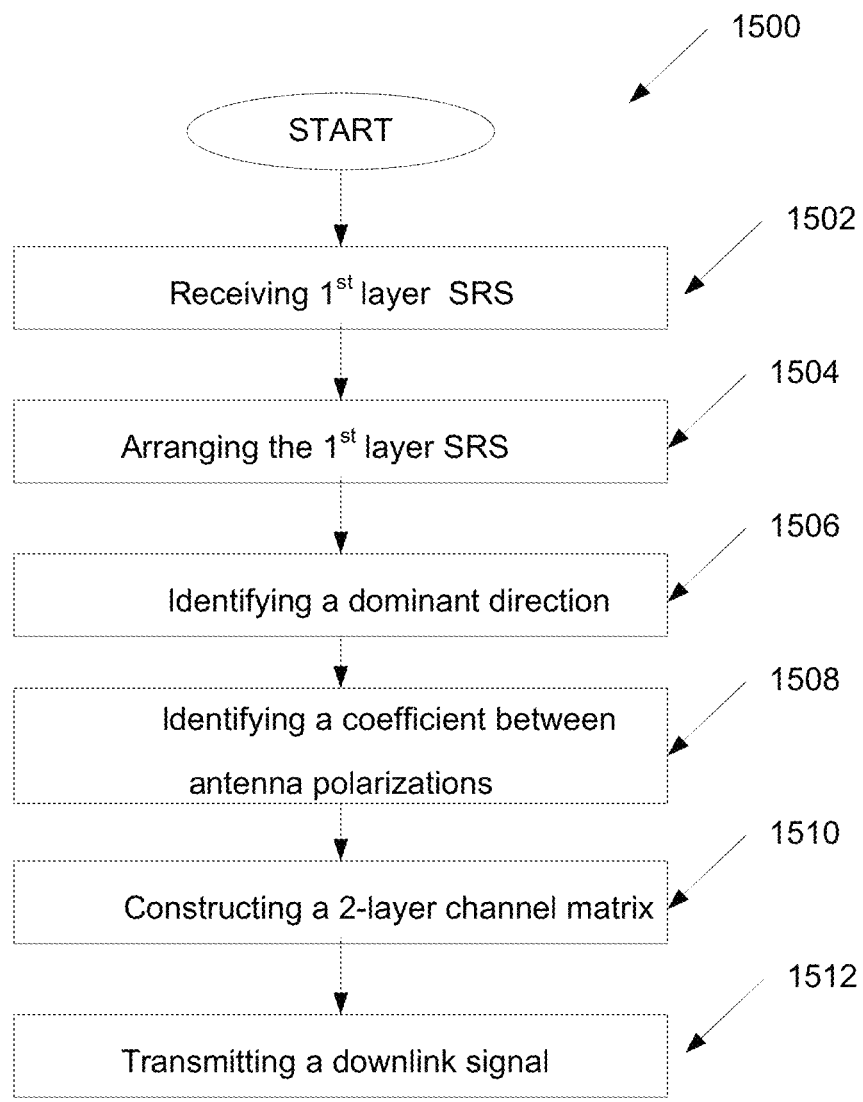
FIG. 15 illustrates a flowchart of a method for rank2 CSI construction with 1-layer SRS according to embodiments of the present disclosure.

FIG. 15 illustrates a flowchart of a method 1500 for rank-2 CSI construction with 1-layer SRS according to embodiments of the present disclosure, as may be performed by a base station (e.g., 101-103 as illustrated in FIG. 1). The embodiment of the method 1500 illustrated in FIG. 15 is for illustration only. FIG. 15 does not limit the scope of the present disclosure to any particular implementation.

As illustrated in FIG. 15, the method begins at step 1502. In step 1502, the BS receives, from a user equipment (UE), a $1^{st}$ layer sounding reference signal (SRS).

Subsequently, in step 1504, the BS arranges the $1^{st}$ layer SRS based on two antenna polarizations of an antenna system of the BS.

Subsequently, in step 1506, the BS identifies a dominant direction of a channel based on the $1^{st}$ layer SRS.

Subsequently, in step 1508, the BS identifies a coefficient between two antenna polarizations based on the $1^{st}$ layer SRS.

Next, in step 1510, the BS constructs a 2-layer channel matrix based on the identified dominant direction and the identified coefficient.

Finally, in step 1512, the BS transmits, to the UE, a downlink signal via the antenna system based on the constructed 2-layer channel matrix.

In one embodiment, the BS further identifies, based on the $1^{st}$ layer SRS, channel coefficients for the two antenna polarization directions, respectively; switches the channel coefficients between the two antenna polarizations; negates the channel coefficients for one of the two antenna polarizations to construct a $2^{nd}$ layer channel coefficients; and combines the $1^{st}$ layer SRS and the $2^{nd}$ layer channel coefficients.

In one embodiment, the BS further identifies an eigen direction and a pair of least-square (LS) fitted parameters for the two antenna polarizations; configures a $1^{st}$ layer CSI based on the identified pair of LS fitted parameters and the eigen direction; switches channel coefficients between the two antenna polarizations; negates the channel coefficients for one of the two antenna polarizations to construct a $2^{nd}$ layer channel coefficients; and normalizes a 2-layer CSI to construct the 2-layer channel matrix.

In one embodiment, the BS arranges $1^{st}$ layer SRS channel coefficients, based on directions of the two antenna polarizations, into a N×2 channel matrix; performs a singular value decomposition of the N×2 channel matrix to obtain dominant channel directions of co-polarization array and the identified coefficient between cross-polarizations; and determines a $2^{nd}$ layer CSI based on the performed singular value decomposition according to the dominant channel directions of co-polarization and a linear combination of the identified coefficient between the cross-polarizations, wherein a $1^{st}$ layer CSI is unchanged. In one embodiment, the BS further may perform an orthogonalization to a 2-layer CSI as an optional function.

In one embodiment, the BS configures a pool of random precoders; identifies channel quality indicator (CQI) received from the UE; and selects a multi-user multi-input multi-output (MU-MIMO) precoder from the pool of random precoders based on the identified CQI, the $1^{st}$ layer SRS of the UE, and a $2^{nd}$ layer precoder of the UEs being served in the wireless communication system. In such embodiment, the BS transmits, to the UE, the constructed MU-MIMO precoder via a downlink channel.

In one embodiment, the BS receives, from the UE, rank information for a rank adaptation. In such embodiments, the BS determines orthogonality of a pool of UEs according to both layers of rank-2 UE; and determines whether the rank information includes a rank-1 or a rank-2.

In one embodiment, the BS further schedules a set of UEs based on the determined rank information based on a network loading status belong to the BS; adjusts CQI of each layer of the layers of rank-2 UE; and determines modulation coding scheme (MCS) for each layer based on the adjusted CQI.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) in a wireless communication system, the BS comprising:
   a transceiver configured to receive, from a user equipment (UE), a $1^{st}$ layer sounding reference signal (SRS); and
   a processor operably connected to the transceiver, the processor configured to:
      arrange the $1^{st}$ layer SRS based on two antenna polarizations of an antenna system of the BS,
      identify a dominant direction of a channel based on the $1^{st}$ layer SRS,
      identify a coefficient between two antenna polarizations based on the $1^{st}$ layer SRS, and
      construct a 2-layer channel matrix based on the identified dominant direction and the identified coefficient,
   wherein the transceiver is further configured to transmit, to the UE, a downlink signal via the antenna system based on the constructed 2-layer channel matrix.

2. The BS of claim 1, wherein the processor is further configured to:
   identify, based on the $1^{st}$ layer SRS, channel coefficients for the two antenna polarization directions, respectively;
   switch the channel coefficients between the two antenna polarizations;
   negate the channel coefficients for one of the two antenna polarizations to construct a $2^{nd}$ layer channel coefficients; and
   combine the $1^{st}$ layer SRS and the $2^{nd}$ layer channel coefficients.

3. The BS of claim 1, wherein the processor is further configured to:
   identify an eigen direction and a pair of least-square (LS) fitted parameters for the two antenna polarizations;
   configure a $1^{st}$ layer channel state information (CSI) based on the identified pair of LS fitted parameters and the eigen direction;
   switch channel coefficients between the two antenna polarizations;
   negate the channel coefficients for one of the two antenna polarizations to construct a $2^{nd}$ layer channel coefficients; and
   normalize a 2-layer CSI to construct the 2-layer channel matrix.

4. The BS of claim 1, wherein the processor is further configured to:
   arrange $1^{st}$ layer SRS channel coefficients, based on directions of the two antenna polarizations, into a N×2 channel matrix;
   perform a singular value decomposition of the N×2 channel matrix to obtain dominant channel directions of co-polarization array and the identified coefficient between cross-polarizations; and
   determine a $2^{nd}$ layer channel state information (CSI) based on the performed singular value decomposition according to the dominant channel directions of co-polarization and a linear combination of the identified coefficient between the cross-polarizations, wherein a $1^{st}$ layer CSI is unchanged.

5. The BS of claim 1, wherein:
   the processor is further configured to:
      configure a pool of random precoders;
      identify channel quality indicator (CQI) received from the UE; and
      select a multi-user multi-input multi-output (MU-MIMO) precoder from the pool of random precoders based on the identified CQI, the $1^{st}$ layer SRS of the UE, and a $2^{nd}$ layer precoder of the UE being served in the wireless communication system; and
   the transceiver is further configured to transmit, to the UE, the selected MU-MIMO precoder via a downlink channel.

6. The BS of claim 1, wherein:
   the transceiver is further configured to receive, from the UE, rank information for a rank adaptation; and
   the processor is further configured to:
      determine orthogonality of a pool of UEs according to both layers of rank-2 UE; and
      determine whether the rank information includes a rank-1 or a rank-2.

7. The BS of claim 6, wherein the processor is further configured to:
   schedule a set of UEs based on the determined rank information based on a network loading status belong to the BS;
   adjust CQI of each layer of the layers of rank-2 UE; and
   determine modulation coding scheme (MCS) for each layer based on the adjusted CQI.

8. A method of a base station (BS) in a wireless communication system, the method comprising:
   receiving, from a user equipment (UE), a $1^{st}$ layer sounding reference signal (SRS);
   arranging the $1^{st}$ layer SRS based on two antenna polarizations of an antenna system of the BS;
   identifying a dominant direction of a channel based on the $1^{st}$ layer SRS;
   identifying a coefficient between two antenna polarizations based on the $1^{st}$ layer SRS;
   constructing a 2-layer channel matrix based on the identified dominant direction and the identified coefficient; and
   transmitting, to the UE, a downlink signal via the antenna system based on the constructed 2-layer channel matrix.

9. The method of claim 8, further comprising:
   identifying, based on the $1^{st}$ layer SRS, channel coefficients for the two antenna polarization directions, respectively;
   switching the channel coefficients between the two antenna polarizations;
   negating the channel coefficients for one of the two antenna polarizations to construct a $2^{nd}$ layer channel coefficients; and
   combining the $1^{st}$ layer SRS and the $2^{nd}$ layer channel coefficients.

10. The method of claim 8, further comprising:
    identifying an eigen direction and a pair of least-square (LS) fitted parameters for the two antenna polarizations;
    configuring a $1^{st}$ layer channel state information (CSI) based on the identified pair of LS fitted parameters and the eigen direction;

switching channel coefficients between the two antenna polarizations;

negating the channel coefficient for one of the two antenna polarizations to construct a $2^{nd}$ layer channel coefficients; and normalizing a 2-layer CSI to construct the 2-layer channel matrix.

11. The method of claim 8, further comprising:

arranging $1^{st}$ layer SRS channel coefficients, based on directions of the two antenna polarizations, into a N×2 channel matrix;

performing a singular value decomposition of the N×2 channel matrix to obtain dominant channel directions of co-polarization array and the identified coefficient between cross-polarizations; and determining a $2^{nd}$ layer channel state information (CSI) based on the performed singular value decomposition according to the dominant channel directions of co-polarization and a linear combination of the identified coefficient between the cross-polarizations, wherein a layer CSI is unchanged.

12. The method of claim 8, further comprising:

configuring a pool of random precoders;

identifying channel quality indicator (CQI) received from the UE;

selecting a multi-user multi-input multi-output (MU-MIMO) precoder from the pool of random precoders based on the identified CQI, the $1^{st}$ layer SRS of the UE, and a $2^{nd}$ layer precoder of the UE being served in the wireless communication system; and transmitting, to the UE, the selected MU-MIMO precoder via a downlink channel.

13. The method of claim 8, further comprising:

receiving, from the UE, rank information for a rank adaptation;

determining orthogonality of a pool of UEs according to both layers of rank-2 UE; and determining whether the rank information includes a rank-1 or a rank-2.

14. The method of claim 13, further comprising:

scheduling a set of UEs based on the determined rank information based on a network loading status belong to the BS;

adjusting CQI of each layer of the layers of rank-2 UE; and determining modulation coding scheme (MCS) for each layer based on the adjusted CQI.

15. A non-transitory computer-readable medium comprising program code, that when executed by at least one processor of a base station (BS) in a wireless communication system, causes the BS to:

receive, from a user equipment (UE), a $1^{st}$ layer sounding reference signal (SRS);

arrange the $1^{st}$ layer SRS based on two antenna polarizations of an antenna system of the BS;

identify a dominant direction of a channel based on the $1^{st}$ layer SRS;

identify a coefficient between two antenna polarizations based on the $1^{st}$ layer SRS;

construct a 2-layer channel matrix based on the identified dominant direction and the identified coefficient; and transmit, to the UE, a downlink signal via the antenna system based on the constructed 2-layer channel matrix.

16. The computer-readable medium of claim 15, further comprising program code, that when executed by the at least one processor, causes the BS to:

identify, based on the $1^{st}$ layer SRS, channel coefficients for the two antenna polarization directions, respectively;

switch the channel coefficients between the two antenna polarizations;

negate the channel coefficients for one of the two antenna polarizations to construct a $2^{nd}$ layer channel coefficients; and combine the $1^{st}$ layer SRS and the $2^{nd}$ layer channel coefficients.

17. The computer-readable medium of claim 15, further comprising program code, that when executed by the at least one processor, causes the BS to:

identify an eigen direction and a pair of least-square (LS) fitted parameters for the two antenna polarizations;

configure a $1^{st}$ layer channel state information (CSI) based on the identified pair of LS fitted parameters and the eigen direction;

switch channel coefficients between the two antenna polarizations;

negate the channel coefficients for one of the two antenna polarizations to construct a $2^{nd}$ layer channel coefficients; and normalize a 2-layer CSI to construct the 2-layer channel matrix.

18. The computer-readable medium of claim 15, further comprising program code, that when executed by the at least one processor, causes the BS to:

arrange $1^{st}$ layer SRS channel coefficients, based on directions of the two antenna polarizations, into a N×2 channel matrix;

perform a singular value decomposition of the N×2 channel matrix to obtain dominant channel directions of co-polarization array and the identified coefficient between cross-polarizations; and determine a $2^{nd}$ layer channel state information (CSI) based on the performed singular value decomposition according to the dominant channel directions of co-polarization and a linear combination of the identified coefficient between the cross-polarizations, wherein a $1^{st}$ layer CSI is unchanged.

19. The computer-readable medium of claim 15, further comprising program code, that when executed by the at least one processor, causes the BS to:

configure a pool of random precoders;

identify channel quality indicator (CQI) received from the UE;

select a multi-user multi-input multi-output (MU-MIMO) precoder from the pool of random precoders based on the identified CQI, the $1^{st}$ layer SRS of the UE, and a $2^{nd}$ layer precoder of the UE being served in the wireless communication system; and transmit, to the UE, the selected MU-MIMO precoder via a downlink channel.

20. The computer-readable medium of claim 15, further comprising program code, that when executed by the at least one processor, causes the BS to:

receive, from the UE, rank information for a rank adaptation;

determine orthogonality of a pool of UEs according to both layers of rank-2 UE;

determine whether the rank information includes a rank-1 or a rank-2;

schedule a set of UEs based on the determined rank information based on a network loading status belong to the BS;

adjust CQI of each layer of the layers of rank-2 UE; and determine modulation coding scheme (MCS) for each layer based on the adjusted CQI.

* * * * *